R. H. SPRINGSTEED.
Metal Drill.
No. 2,961. Patented Feb. 20, 1843.
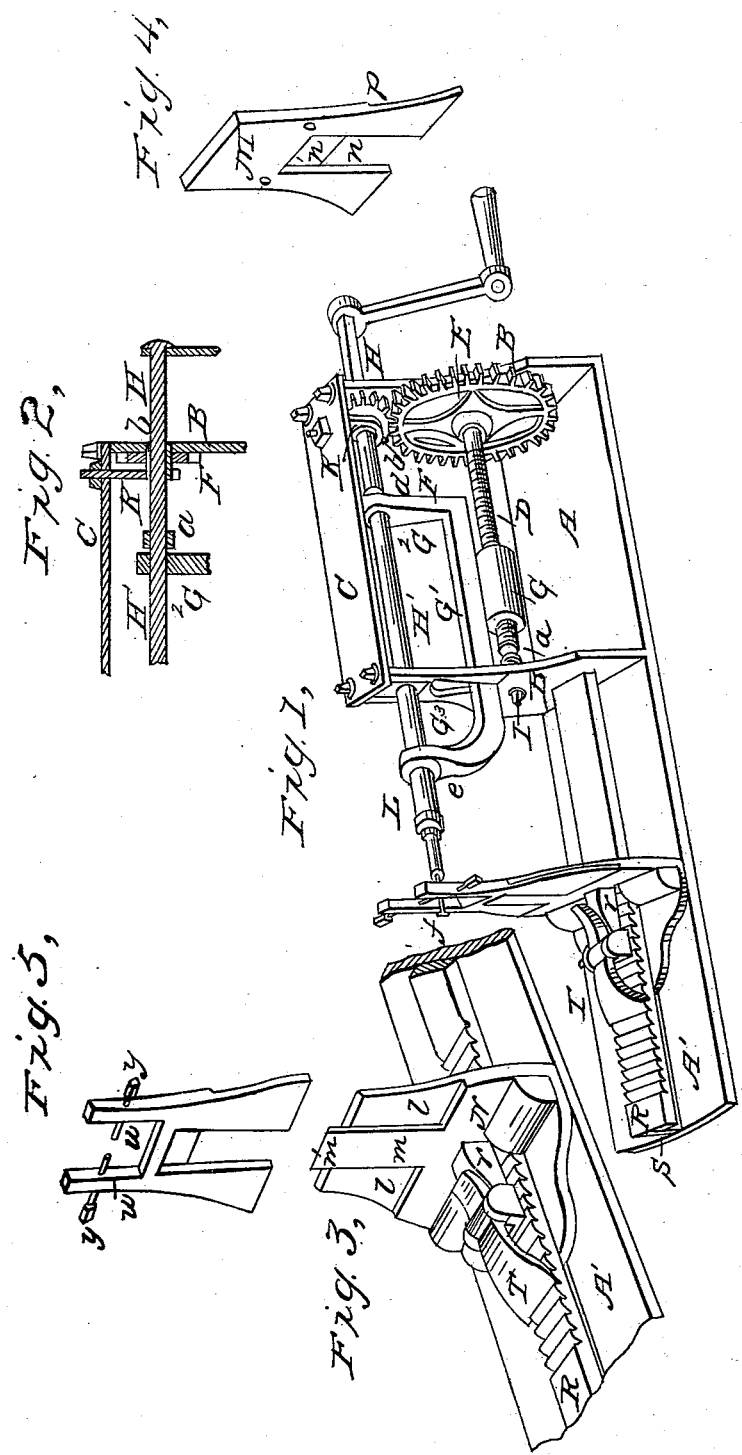

UNITED STATES PATENT OFFICE.

R. H. SPRINGSTEED, OF WOOSTER, OHIO.

MACHINE FOR DRILLING.

Specification of Letters Patent No. 2,961, dated February 20, 1843.

*To all whom it may concern:*

Be it known that I, R. H. SPRINGSTEED, of Wooster, Ohio, have invented a new and useful Improvement in Machines for Drilling Metals and other Substances, of which the following is a full and accurate description, reference being had to the accompanying drawings, making part of this specification.
In Figure 1 a perspective view of the machine is given, A A' being an oblong plate or platform, B a vertical support rising from the end of said platform and B' another vertical support of the same height as the first and immediately opposite to it rising from the platform nearer its end A', the distance between the supports being determined by the size of the machine. The supports are firmly secured to the platform at bottom and are connected at top by a horizontal bar or plate C the whole forming a frame in which the drilling parts of my apparatus are arranged and operated. These consist of a driving screw D, Fig. 1, having a cog wheel E at one end of it for forcing or feeding the drill upon the work; of a guide constructed with a female screw through which the power of the driving screw is communicated to the drill stock; a drill stock H H' passing through arms $G^2 G^3$ of the guide by which arms it is moved backward or forward according to the direction in which the driving screw is turned, and of a pinion or small cog wheel F turned by the drill stock H (which has a crank on its end outside the upright B) and gearing into the cog wheel E for operating both it and the driving screw—the arrangement of these parts being such as to allow of the workman pressing the drill stock continually forward so as to keep the point of the drill always against the work while turning the driving screw with the drill stock, without throwing the cog wheel E and pinion F out of gear.
D, Fig. 1, is the driving screw the length of which depends on the distance between the uprights B and B', it being arranged lengthwise between these uprights—at one end of it next the upright or support B the cog wheel E is placed, the extremity of the driving screw entering the center of the wheel. The driving screw is supported at one end by a pivot passing through the upright B into the center of the cog wheel E or rather the end of the screw within the wheel where a socket is made to receive it, at its opposite end the driving screw is itself turned down in the lathe for a short distance so as to form a pivot which is socketed in the end of a set screw I passed through the upright B'. This socket corresponds in depth to the length of the pivot which it receives so that when the screw I is forced up as far as it can go the end of the screw presses against the shoulder $a$ formed on the driving screw D in turning it down to make the pivot referred to. As this arrangement however would not allow the driving screw to move with sufficient freedom the set screw I is introduced only so far as to permit the pivot of the driving screw to enter the socket in it a short distance. This when the pivot at the opposite end of the driving screw is wholly in its socket leaves a space between the shoulder $a$ of the driving screw and the end of the set screw I which may be increased or diminished in extent by tightening or loosening the set screw I allowing the driving screw to have a limited motion backward and forward and to turn with less friction than it otherwise would do. In Fig. 1 the machine is drawn so as to show this arrangement the set screw I and a portion of the pivot between it and the shoulder $a$ being represented.

Immediately above the cog wheel E and so arranged as to gear into it I place a pinion F the arbor of which is supported on each side of said pinion turning on one side in a circular aperture made through the upright B on the other side in a similar aperture made through a stud K projecting from the underside of the top plate C as shown in section at Fig. 2 where $b$ is the arbor of the pinion F passing through said pinion and resting in the supports referred to. Through the center of this arbor $b$ there is a square opening adapted to a square portion of the drillstock which enters it and is so constructed to allow of its turning the pinion F as shown in Fig. 1 where $b$ is the arbor of the pinion one end of it only being seen and H the square part of the drillstock passing through it. The drillstock passes first through the openings in the arbor $b$ and the upright B supporting said arbor then through a circular opening in the upper end of the vertical arm $G^2$ of the guide to be described next through a similar opening in the upright B' and thence through another circular opening in the upper end of the arm $G^3$ of the guide, all these openings being in a line with each other. The drillstock where it passes through the openings in the arms G² G³ of the guide and the upright B' is of a cylindrical form being of that form for nearly two thirds of its length and for the remainder of its length of a square form as seen at H, Fig. 1, this part of the drillstock passing as already described through the arbor of the pinion F, at the junction of the cylindrical and square portions of the drillstock a bead or shoulder d is raised upon it by turning the cylindrical part of the drillstock down in the lathe so as to leave this point of greater diameter than the rest making it a *point d'appice* against which the arm G² of the guide presses in forcing back the drillstock. On the cylindrical end of the drillstock a short cap marked L of the same form is screwed carrying the drill or bit ƒ in an aperture in its outer end, the drillstock having a screw cut on it (not shown in the drawing) adapted to a female screw in the inner end of the cap. The end of this cap next the drillstock is raised like that marked (d) upon the drillstock so as to form a similar shoulder marked (e) against which the arm G³ of the guide presses in feeding the drill upon the work.

The guide consists of a female screw (g) adapted to the driving screw D the latter passing through it so as to move it back and forth. It is attached to a horizontal bar G' lying immediately above and parallel to said driving screw; the front end of this bar passing through a slit in the upright B' on the outside of which it is bent upward so as to form a vertical arm G³ the rear end of the bar being bent upward in a similar manner to form the arm G² of the guide. These arms G² G³ have as already stated apertures near their upper ends for the drillstock to pass through and are situated when in place between the shoulders d e of the drillstock for moving it backward and forward as may be necessary. The drillstock has however a motion backward and forward independent of that given it by the driving screw through the arms G² G³ of the guide, as the apertures in the upper ends of these arms, in the uprights B B', and the arbor b of the pinion F, are made sufficiently large to allow of a limited motion of this kind being given it, enabling the operator to press the point of the drill continually against the work while turning the driving screw. The arms G² G³ of the guide are so arranged on the drillstock, between the shoulders d e, as to admit of this limited motion. When the arm G³ is forced by the driving screw against the shoulder e, the arm d is carried with it, leaving a space between it and the shoulder d, which allows the drillstock to be pressed forward. This direct movement of the drillstock is still further increased by the manner in which the driving screw is arranged. When the drill is forced upon the work, the driving screw D is pressed back by the resistance of the substance to be drilled upon the pivot supporting its end next the upright B, leaving a space necessarily between the shoulder a at its opposite end and the set screw I, which allows, after the shoulder d of the drillstock has been pressed up against the arm G² of the guide, of the drillstock being moved still further forward, as by continuing the pressure upon it, the shoulder d acting upon the arm G² will force both it and the driving screw forward until the shoulder a of the latter is met by the end of the set screw I, the drillstock moving forward with it upon the work. This arrangement is productive of a still further advantage as it allows, in case the resistance to the drill is greater than the force it exerts, of the drillstock and driving screw yielding so as to prevent any injury to the machine.

The next branch of my invention is an improvement in the mode of constructing and arranging that part of the machine against which the drilling is performed. It consists of a breast plate and a slide adapted to it which may be removed to allow of another slide of the same general construction but suited to a different kind of work being substituted in its place. N Fig. 3 is the breast. It is a vertical plate parallel with the upright B' and as shown in Fig. 1 and is arranged between it and the end A' of the platform of the machine. It is somewhat wider at bottom than top and has a square opening at the middle of its base to allow of a ratchet bar or way R on which it slides back and forth passing under it. A horizontal plate O is attached to the bottom of the breast plate N on each side of the way or bar R projecting backward from it at right angles and lying with its flat surface opposed to the platform. The way or ratchet bar R extends from the front of the upright B' to the end A' of the platform and is raised or supported on a narrow bar S of the same length but only half its width, the end of which is seen in the drawing, extending under it the whole distance and so arranged that the way or ratchet R projects over it on each side forming with it and the surface of the platform a groove in which the inner side of each of the horizontal plates O O is received—this arrangement keeping them in place when pressure is applied to the breast piece N. The bar or way R has ratchet teeth t t on its upper surface which project toward the upright B'—a pawl or click T is hinged between two vertical ears or projections on the end of a horizontal bar V, extended from the back of the breast plate N—one end of the pawl projecting downward and forward is adapted to the teeth of the ratchet bar while its opposite end, it being hinged near the middle, projects backward having a spring attached to its under surface like the keys of musical instruments which pressing on the upper surface of the arm V keeps the pawl in place. The back of the breast plate N above the point where the arm V projects is of a peculiar construction to allow of the slide being adapted to it. The upper half of the plate is filed away on the back so as to be only of half the thickness of the lower part forming a shoulder where the latter part projects as shown in the drawing where *k* is this shoulder extending across the plate and *l l* the part of the plate filed away as described. An oblong plate *m m'* is placed vertically on this part *l l* of the breast lying with its flat surface upon it, its lower end resting on the middle of the shoulder K and its upper end *m'* projecting some distance above it. Its sides and end *m'* being beveled on their edges next the breast plate N to adapt them to a similar construction of the slide. This slide is shown at Fig. 4, M being the back of the slide. It is wider at bottom than top and its front surface which is not shown in the drawing has its lower half filed away so as to form a shoulder above it where the upper part projects in front of it as seen at Fig. 4 in the end view of the slide where *p* is the shoulder referred to. A vertical opening is made in the slide from its lower toward its upper end by removing a portion of it of the same exact size and form as the piece *m m'* on the breast plate N a portion of this opening next its upper end being only carried through half the thickness of the slide forming a sort of recess in it as seen at Fig. 4 where *n* is the opening in the slide and *n'* the recess, the sides of this opening next the back M of the plate being beveled to adapt them when in place to the beveled edges of the corresponding piece *m m'* of the breast N to which the opening *n n'* is adapted. The slide is fitted on the breast in a vertical position so that the plate *m m'* shall enter and adapt itself to the opening *n n'* in the slide the projecting point *m'* of the plate when in place fitting into the recess *n'* of the slide and the beveled edges of the latter under those of the said plate giving by this arrangement a firm support to the slide. The lower half of the slide is filed away in front as described to adapt it when in place to the part *l l* of the breast plate N, against which it is fitted allowing also of the projection *m'* on the top of the breast plate N entering the recess *n'* which is formed in the upper half of the slide the shoulder *p* of the slide when in this position resting on the top of the breast plate N. The breast plate and slide when thus adapted to each other presenting a uniform surface on each side as shown in Fig. 3 where a slide is seen attached to the breast of the same general construction as that in Fig. 4 differing from it only in having a vertical projection rising from each side on top provided with a set screw by which articles to be drilled can be supported between these parts or projections as shown in Fig. 5 where *w w* are the projections referred to and *y y* the set screws.

In describing the drilling part of my machine I should have stated that the pinion F may be dispensed with and the power applied directly to the driving screw, an arrangement which is not as advantageous however as the one described.

Having described the construction and operation of my machine what I claim as my invention and desire to secure by Letters Patent is—

1. Combining the driving screw with the drill stock by means of the guide (consisting of the female screw G the horizontal bar G' and vertical arms $G^2$ $G^3$) arranged and operating in the manner set forth.

2. I claim giving to the drill stock end play within the guide, in combination with the pinion F and driving screw and guide, by which combination the drill can be pushed up independent of the feeding apparatus—all as described.

R. H. SPRINGSTEED.

Witnesses:
ALEXR. B. FLEMING,
C. H. STRUBY.